(12) United States Patent
Jaśkiewicz et al.

(10) Patent No.: US 11,530,755 B2
(45) Date of Patent: Dec. 20, 2022

(54) SERVO VALVE

(71) Applicant: Hamilton Sundstrand Corporation, Charlotte, NC (US)

(72) Inventors: Zbigniew Jaśkiewicz, Wrocław (PL); Sebastian Szymański, Wrocław (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/516,642

(22) Filed: Jul. 19, 2019

(65) Prior Publication Data
US 2020/0166151 A1 May 28, 2020

(30) Foreign Application Priority Data
Nov. 27, 2018 (EP) ................. 18461634

(51) Int. Cl.
*F16K 31/00* (2006.01)
*F16K 11/07* (2006.01)

(52) U.S. Cl.
CPC ........... *F16K 31/008* (2013.01); *F16K 11/07* (2013.01)

(58) Field of Classification Search
CPC ...... F16K 31/008; F16K 11/07; F16K 31/004; F16K 31/007; F15B 13/044; F15B 13/0402; Y10T 137/86614
See application file for complete search history.

(56) References Cited

U.S. PATENT DOCUMENTS

| 4,046,061 | A | 9/1977 | Stokes |
| 4,929,859 | A | 5/1990 | Suzuki et al. |
| 6,170,526 | B1* | 1/2001 | O'Neill ............ F16K 31/007 137/625.65 |
| 6,526,864 | B2 | 3/2003 | Lindler et al. |
| 6,786,238 | B2 | 9/2004 | Frisch |
| 9,309,900 | B2 | 4/2016 | Kopp |
| 2007/0075286 | A1 | 4/2007 | Tanner |
| 2015/0047729 | A1 | 2/2015 | Kopp et al. |

FOREIGN PATENT DOCUMENTS

| CN | 101319688 B | 9/2010 |
| CN | 102979941 B | 6/2014 |
| EP | 3321513 A1 | 5/2018 |
| GB | 2104249 A | 3/1983 |
| JP | S6078179 A | 5/1985 |

OTHER PUBLICATIONS

Extended European Search Report for International Application No. 18461634.0 dated Jun. 7, 2019, 13 pages.

* cited by examiner

*Primary Examiner* — Kelsey E Cary
(74) *Attorney, Agent, or Firm* — Cantor Colburn LLP

(57) ABSTRACT

A servo valve comprising: a fluid transfer valve assembly comprising a supply port and a control port ($P_A$, $P_B$); a moveable valve spool arranged to regulate flow of fluid from the supply port to the control port in response to a control signal; and a drive means configured to axially move the valve spool relative to the fluid transfer assembly in response to the control signal to regulate the fluid flow; wherein the drive means comprises a piezo actuator element mounted within and axially movable with the valve spool, the piezo actuator configured to extend axially in response to the control signal to cause corresponding axially movement of the spool.

2 Claims, 3 Drawing Sheets

SERVO VALVE

FOREIGN PRIORITY

This application claims priority to European Patent Application No. 18461634.0 filed Nov. 27, 2018, the entire contents of which is incorporated herein by reference.

TECHNICAL FIELD

The present disclosure relates to servo valves used to transfer quantities of, or manage the flow of fluid e.g. oil, fuel, air etc.

BACKGROUND

Servo valves find a wide range of applications for controlling air or other fluid flow to effect driving or control of another part e.g. an actuator.

A servo valve assembly includes a drive assembly e.g. a motor controlled by a control current which controls flow to a valve e.g. an air valve to control an actuator. Generally, a servo valve transforms an input control signal into movement of an actuator cylinder. The actuator controls e.g. an air valve. In other words, a servo valve acts as a controller, which commands the actuator, which changes the position of an air valve's flow modulating feature.

Such mechanisms are used, for example, in various parts of aircraft where the management of fluid/air flow is required, such as in engine bleeding systems, anti-ice systems, air conditioning systems and cabin pressure systems. Servo valves are widely used to control the flow and pressure of pneumatic and hydraulic fluids to an actuator, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known—see e.g. GB 2104249, US 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Such conventional systems will be described in more detail below with reference to FIGS. 1a and 1b.

Particularly in aircraft applications, but also in other applications, servo valves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servo valves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servo valves provide an alternative to 'flapper'—type servo valves. Jet pipe servo valves are usually larger than flapper type servo valves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

Such systems will be described further below with reference to FIG. 1a.

As mentioned above, jet pipe servo valves are advantageous in that they are less sensitive to contamination e.g. in the supply fluid or from the valve environment. These valves are, however, more complex and bulkier. Additional joints are required for the fluid supply pipe, and the supply pipe from the fluid supply to the jet pipe is mounted outside of the servo valve body in the torque motor chamber. In the event of damage to the pipe, this can result in external leakage. The pipe, being external, adds to the overall size and is more vulnerable to damage.

European Patent Application 16461572 teaches a jet-pipe type servo valve wherein fluid is provided to the nozzle via a connector header in fluid communication with the interior of the spool, the spool being provided with one or more openings via which fluid from the supply port enters the interior of the spool and flows into the connector header and to the nozzle.

The servo valve includes drive means for steering the nozzle in response to the control signal. The drive means may include a motor such as a torque motor arranged to steer the nozzle by means of an induced current. Other drive means may be used to vary the position of the nozzle. The drive means may be mounted in a housing attached to the valve assembly.

The arrangement of EP 16461572 enables the conventional outside supply pipe to be removed and allows the jet pipe to be fed with fluid via the spool and a feedback spring.

The characteristics of flow, however, in such conventional servo valves, are not always fully efficient in their extreme positions (left and right in the drawings) and greater pressure may be needed to ensure correct positioning.

There is a need for improved servo valve arrangements that can handle large fluid flows effectively and at high operation frequency, but with lower power consumption, and enabling variable control, whilst retaining a compact design and being less vulnerable to contamination, damage and leakage.

The present disclosure provides a servo valve as claimed in claim 1.

The fluid transfer valve assembly may further comprise a positioning mechanism at the ends of the valve spool, e.g. a torsion spring at each of the respective ends of the valve spool or some other mechanical or electrical position feedback arrangement.

The valve spool may be moveably mounted in a cylindrical housing, having an end cap at each end.

Also provided is a method of driving a valve spool of a servo valve comprising varying the fluid flow acting on respective ends of the valve spool via a fluid flow path by applying a control signal in the form of an electric potential to a piezo actuator element attached to the valve spool, the electric potential causing the piezo actuator element to change its length in an axial direction of the spool and causing resultant axial movement of the spool.

Preferred embodiments will now be described with reference to the drawings.

DETAILED DESCRIPTION

A servo valve as described below can, for example, be used in an actuator control system. The servo valve is controlled by a drive assembly to control a flow of fluid that is output to control the movement of an actuator. The actuator can control e.g. ailerons or elevator flaps of an aircraft.

Conventional jet pipe and flapper servo valves will first be described with reference to FIGS. 1a and 1b.

Figure 1B:
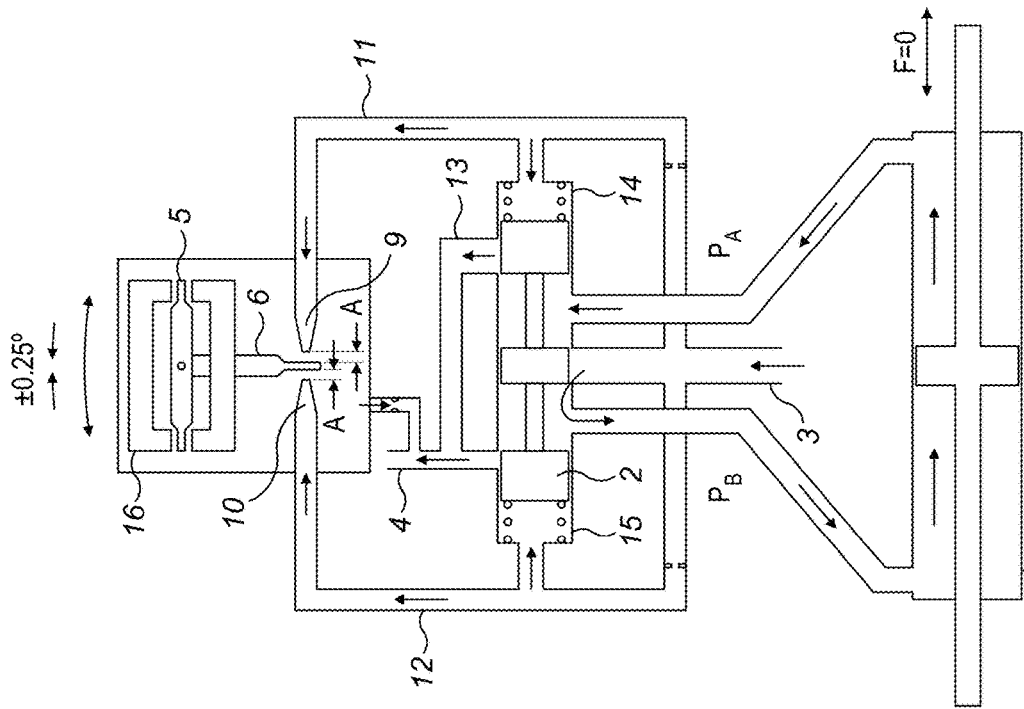
FIG. 1b is a schematic view of a conventional flapper type servo valve.

A typical flapper servo valve is shown in FIG. 1b. The assembly comprises a first stage comprising the drive assembly, and a second stage comprising a spool assembly. FIG. 1b also shows, at the bottom, the actuator 22 controlled by the servo valve. Operation of the valve comprises causing the spool 2 to move to the left and/or right by distance A so as to align ports in the spool 2 with fluid channels to control the flow of fluid through the valve and out of a control port to control the actuator or other moveable part. The spool is part of a spool assembly having: supply ports, control ports, and a return port 4. Flow is possible between the ports $P_A$, $P_B$ via a passage through the spool. The movement of the spool 2 is caused by the pressure of the hydraulic fluid (here oil supplied to the assembly from an oil reservoir or supply (not shown) via orifices but it can be any hydraulic fluid) acting on one or other of the ends of the spool 2 via channels 11,12. As shown by the arrows, fluid flow is from supply channel 3 into the body of the spool 2. Fluid is also diverted from the supply channel 3 into the channels 11 and 12, and further to the orifices 9,10 to create a pressure imbalance to control movement of the spool 2. In a balanced state, the fluid pressure in channels 11 and 12 is essentially equal. Some fluid (the same at each end) acts on the ends of the spool and the rest of the fluid in channels 11 and 12 exits via the orifices 9 and 10 where it is returned to the supply. The pressure at the respective ends is varied in accordance with a control signal applied to the drive assembly selected according to the desired output from the valve. The hydraulic fluid is returned to the supply via a channel 13.

Therefore, when the control signal is such as to cause the drive assembly to apply greater fluid pressure to one end of the spool, by diverting more fluid to that end via channel 12, as compared to channel 11, the spool 2 will move to the right. If greater fluid pressure is applied via channel 11, the spool 2 will move to the left. In the flapper arrangement, shown, the control signal is applied to a torque motor 16 and armature 5 which causes a flapper-type drive member 6 to deflect left or right. The flapper 6 is positioned between orifices 9, 10 at the ends of channels 11,12 respectively. If the control signal, via armature 5, causes the flapper 6 to move to the left thus closing off orifice 10 of channel 12, then essentially all of the hydraulic fluid in channel 12, will be directed to the end of the spool as it can no longer exit orifice 10, thus increasing the pressure at the left end of the spool 2 and causing the spool to move to the right. If the control signal is such as to cause the flapper 6 to move to the right, closing orifice 9 of channel 11, then more pressure is provided to the other end of the spool 2 via channel 11, causing the spool 2 to move to the left.

A positioning mechanism may be provided at the ends of the valve spool, e.g. a torsion spring 14,15 at each of the respective ends of the valve spool or some other mechanical or electrical position feedback arrangement.

The principles of operation are similar for the jet-pipe type assembly, but instead of the drive member being a flapper 6 that moves to close off a respective channel, the drive member is a pipe 7 with a nozzle which is deflected left or right responsive to the control signal and from which fluid is ejected to either the left or the right end of the spool.

Figure 1A:
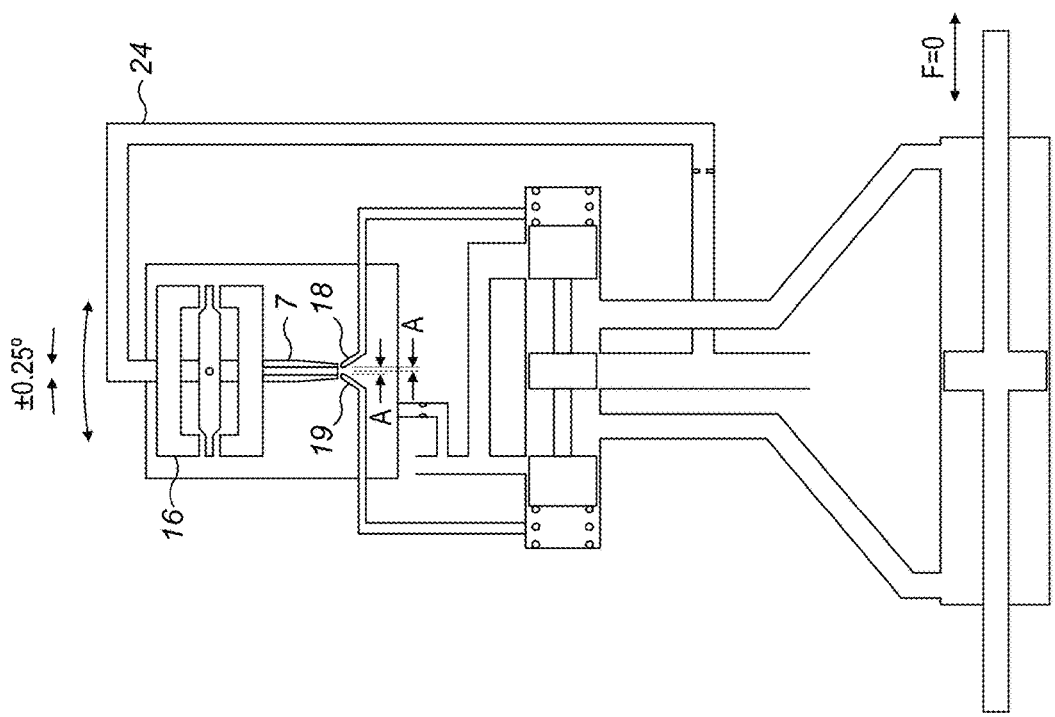
FIG. 1a is a schematic view of a conventional jet-pipe type servo valve.

In a conventional jet-pipe type assembly, as shown in FIG. 1a, the arrangement comprises a servo valve assembly having a torque motor 16 and a moveable spool, mounted in a supporting block, or mounted in a cylinder mounted in a block. The spool is, as for the flapper type arrangement, part of a spool assembly having: supply ports, control ports, and a return port. Flow is possible between the ports via a passage through the spool. The torque motor provides current that causes a jet pipe 7 to turn at its end closest to the spool, which end terminates in a nozzle. Supply fluid is provided from the supply port, via a supply pipe 24 to the top of the jet pipe—i.e. the end opposite the end with the nozzle, and the supply fluid flows through the jet pipe and out of the nozzle. A receiver is provided in the block below the nozzle. The receiver provides two channels 18,19 via which fluid from the nozzle flows into the spool. When no current is applied by the motor to the jet pipe, the nozzle is centered relative to the receiver and supply fluid exiting the nozzle flows equally through both channels and thus equally to both ends of the spool. The spool therefore remains centered—i.e. 'closed' so that no fluid flows through the control ports. When actuator control is desired, the motor provides a control current to the jet pipe causing the nozzle to turn away from the centered position. The fluid supplied through the nozzle then flows predominantly through one receiver channel as compared to the other channel. More fluid flows, therefore, into the corresponding end of the spool causing axial movement of the spool. This either blocks/occludes the passage between the supply port and the respective control port or opens the passage to allow flow between the two ports, depending on the axial position of the spool due to the position of the nozzle, thus modulating pressure on the control ports and controlling the actuator. A supply pipe is also connected to the supply port and routes supply fluid external to the spool and into the top end of the jet pipe. The supply fluid flows down the jet pipe to the nozzle and exits to the receiver described above. The jet pipe is preferably mounted in a flexural tube. While the nozzle is centered, equal amounts of fluid go to the two ends of the spool.

In an example, the assembly is arranged to control an actuator based on the fluid flow from the control port e.g. via a butterfly valve. The servo valve controls an actuator which, in turn, controls an air valve such as a butterfly valve.

Supply pressure is provided to the servo valve housing via the supply port and to the spool via spool supply ports. The pressure at the return port is a return pressure which will vary depending e.g. on the altitude of the aircraft in flight. Control ports provide a controlled pressure, dependant on the nozzle/flapper position and resulting spool position, to be provided to an actuator.

The spool is in the form of a tubular member arranged in a valve block (not shown) to be moved axially by the hydraulic fluid.

In more detail, both in the conventional flapper or jet-pipe type assemblies, to open the servo valve, control current is provided to coils of the motor (e.g. a torque motor) creating electromagnetic torque opposing the sum of mechanical and magnetic torque already 'present' in the torque motor. The bigger the electromagnetic force from the coils, the more the jet pipe nozzle turns or the flapper pivots. The more it turns/pivots, the greater the linear or axial movement of the spool. A torque motor usually consists of coil windings, a ferromagnetic armature, permanent magnets and a mechanical spring (e.g. two torsional bridge shafts). This arrangement provides movement of the nozzle/flapper proportional to the input control current.

Jet-pipe arrangements can operate at high frequency but only for average pressure levels. In contrast, the flapper arrangements can operate at higher pressures but at lower frequency.

As mentioned above, with torque motor-driven pipes or flappers, the extreme positions of the valves are not achieved in an efficient manner.

The inventors have found a solution to this problem by replacing the torque motor and associated drive stage with a piezo actuator located entirely in the valve stage in the valve spool body. This avoids the need for a separate motor and drive stage and the hydraulic system required by conventional systems to move the flapper or jet pipe to change the position of the spool.

Figure 2:
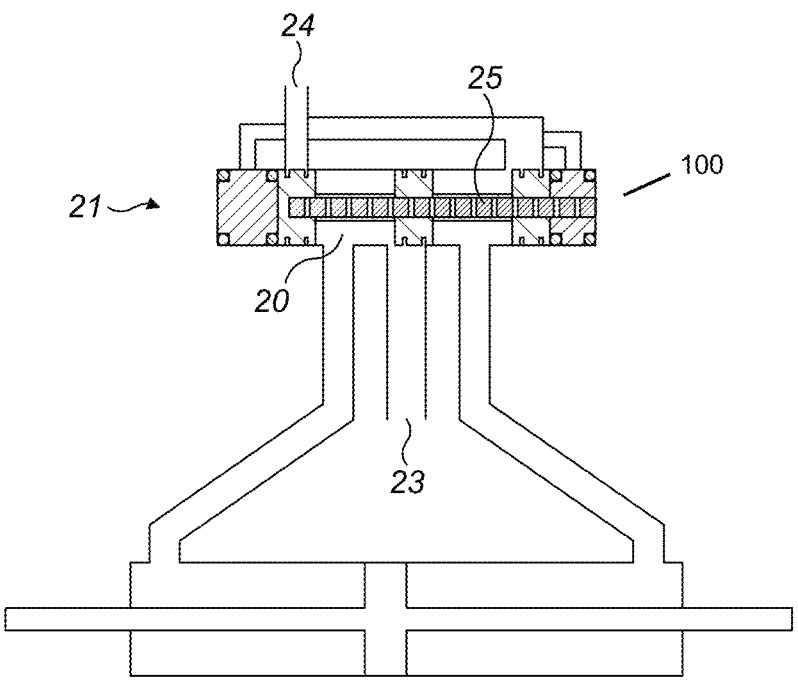
FIG. 2 is a schematic view of a servo valve according to the present disclosure.

As can be seen in FIG. 2, an arrangement according to the disclosure is greatly simplified as compared to the arrangement of FIGS. 1a and 1b. In simple terms, the servo valve according to this disclosure comprises a spool body 20 mounted in a housing 21. A supply port is open for hydraulic fluid such as oil from a supply 23 to be provided to the spool body 20. The oil or other hydraulic fluid flows through and out of the spool body according to the position of the spool body relative to channels and ports as described above, and either exits a control port to move an actuator, or returns to the oil supply via a return port 24.

A piezo actuator element 25 is mounted in the spool body 20 extending from one end thereof and extending into the spool body 20 from that end. A spring is provided at the other end of the spool body 20 to bias the spool body away from that end.

In a neutral position, the spring force acting on one end of the spool is such as to position the spool to define flow channels from the oil supply 23 and the return port 24. To control the spool body 20 to move left or right (with regard to the drawings) a force is applied by the piezo actuator element 25 on the spool body against the force of the spring, thus moving the spool body so that different ports and channels are aligned so as to change the flow path for the hydraulic fluid through the valve. The oil will then be directed through control ports to move the actuator.

The piezo actuator element 25 is caused to deform or extend in response to application of an electric potential to the element which corresponds to the control signal of conventional systems. The applied potential determines the extent to which the piezo actuator element expands along the direction of the spool body length, which determines the amount the spool body moves in that direction, pushed by the piezo actuator element. The ports and channels then align and misalign as in existing systems to define appropriate flow paths.

The rest of the operation of the spool assembly is analogous to that of the flapper and jet-pipe arrangements.

Figure 3:
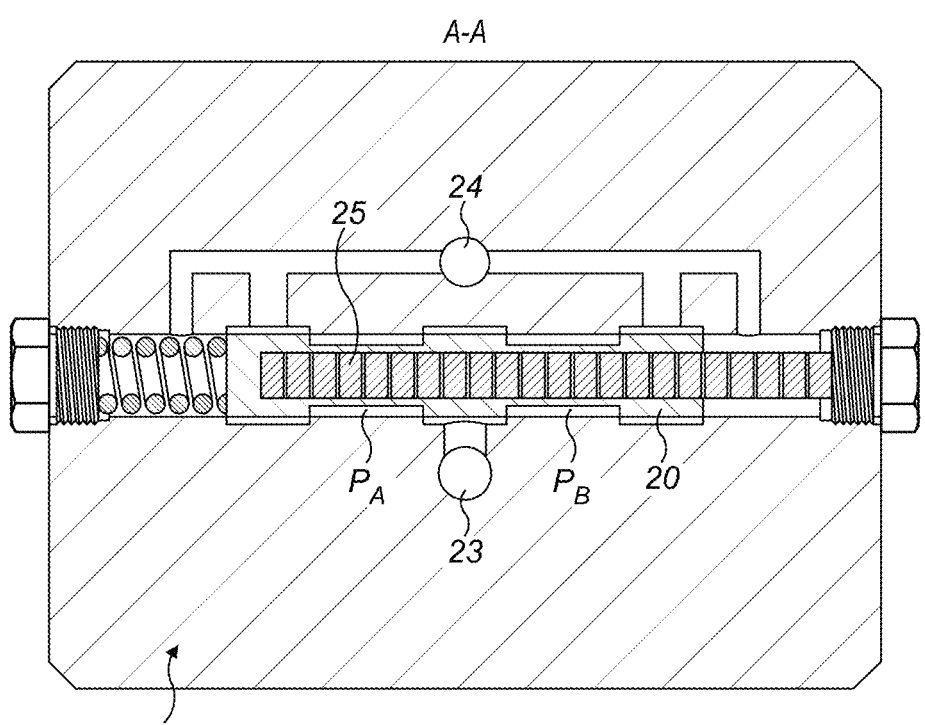
FIG. 3 shows a more detailed view of the spool part of the servo valve assembly of FIG. 2
Figure 4:
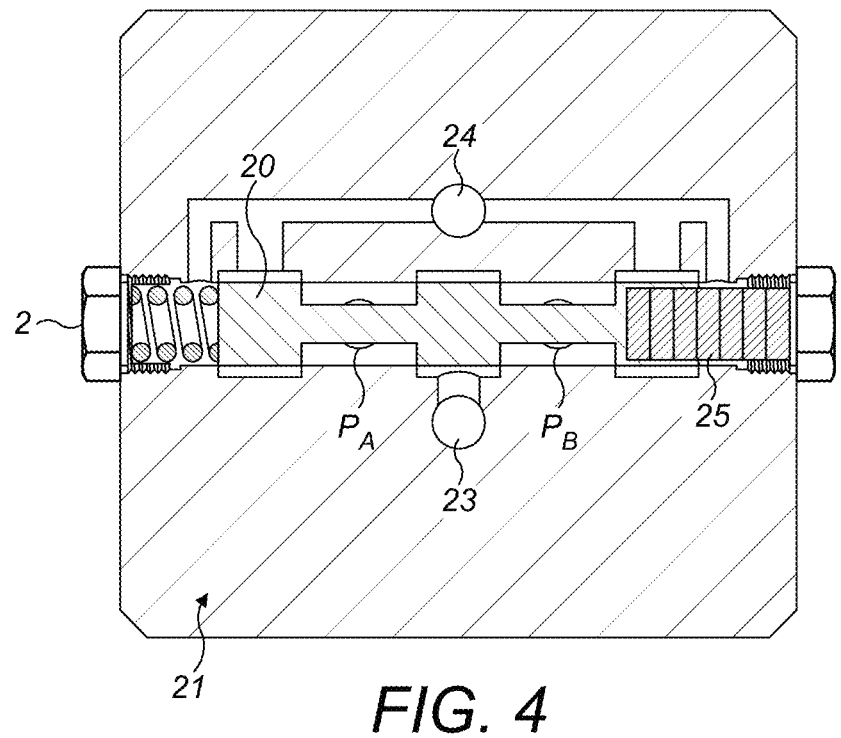
FIGS. 4 and 5 show alternative embodiments of a spool part of the servo valve.
Figure 5:
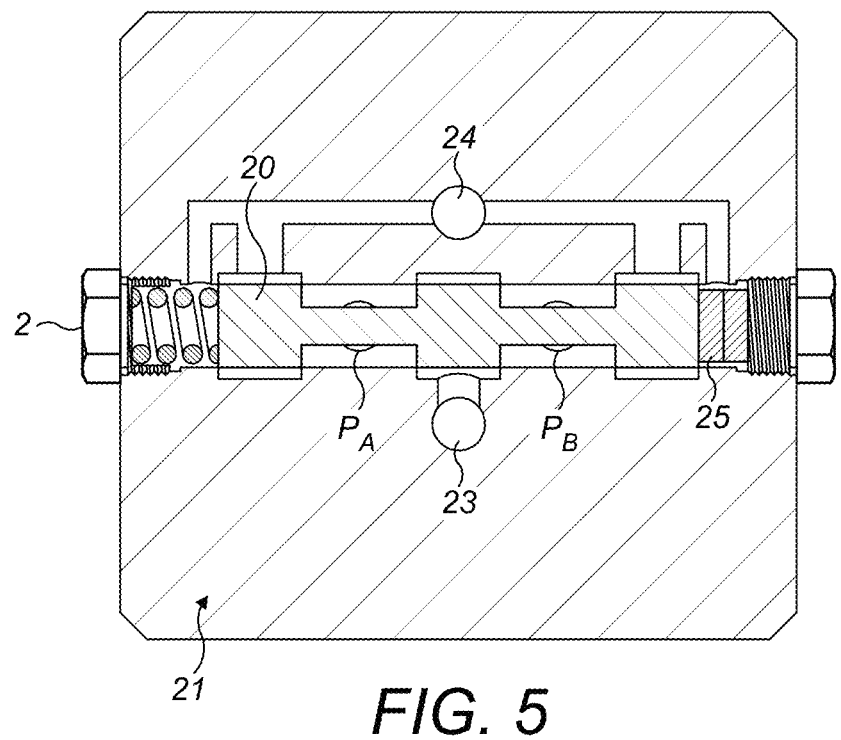

As can be seen in FIG. 3, the piezo actuator element 25 extends within the spool body 20. Depending on application and available materials, the length of the actuator element and the amount to which it extends into the spool body 20 can vary. FIGS. 4 and 5 show other embodiments with shorter actuators. A shorter length, such as shown in FIG. 5, can be used if the material is much more extensible than is usually available. For less extensible material, a longer length will be need for the same effect.

According to the disclosure, with such an arrangement, the conventional two stages of a valve assembly are combined into a single stage. The piezo actuator element acts directly on the spool body in proportion to the control signal. A piezo actuator has at least three to four time greater frequency than conventional torque motor assemblies.

Thus, a servo valve assembly according to this disclosure is much smaller, lighter and simpler than existing designs.

Although this disclosure has been described in terms of preferred examples, it should be understood that these examples are illustrative only and modifications and alterations are possible within the scope of the claims.

The invention claimed is:

1. A servo valve comprising:
    a fluid transfer valve assembly comprising:
        a housing;
        a supply port, a return port and a control port defined in the housing;
        a moveable valve spool located in the housing arranged to allow flow of fluid through the moveable valve spool from the supply port to the return port when the moveable valve spool is in a neutral position relative to the housing and to allow flow of fluid from the supply port to the control port through the moveable valve spool when the moveable valve spool is in a position axially spaced from the neutral position; and
        a drive means configured to axially move the moveable valve spool relative to the housing in response to the control signal to regulate the fluid flow;
        wherein the drive means comprises a piezo actuator element located fully within the housing and extending from a first spool end of a spool body, the piezo actuator configured to have a first length defining the neutral position of the moveable valve spool and to change its length axially in response to a control signal to cause corresponding axially movement of the moveable valve spool to the position axially displaced from the neutral position;
        wherein the piezo actuator element is mounted to the first spool end of the moveable valve spool and extends into the spool body from the first spool end; and
        the servo valve further comprising a spring element located at a second spool end of the moveable valve spool opposite the first spool end arranged to bias the moveable valve spool to the neutral position in an axial direction opposite the direction in which the piezo actuator element moves the spool.

2. The servo valve of claim 1, wherein the control signal is in the form of an electric potential applied to the piezo actuator element to cause the piezo actuator element to change its length in the axial direction.

\* \* \* \* \*